United States Patent [19]

Stricklen et al.

[11] Patent Number: 5,536,802
[45] Date of Patent: Jul. 16, 1996

[54] POLYMERS OF 3 ETHYL-1-HEXENE

[75] Inventors: Phil M. Stricklen, Bartlesville; Charles A. Drake, Nowata, both of Okla.

[73] Assignee: Phillips Petroleum Company, Bartlesville, Okla.

[21] Appl. No.: 434,219

[22] Filed: May 4, 1995

Related U.S. Application Data

[63] Continuation of Ser. No. 793,201, Nov. 6, 1992, abandoned, which is a continuation of Ser. No. 645,992, Jan. 25, 1991, abandoned.

[51] Int. Cl.$^6$ ................................. C08F 110/14
[52] U.S. Cl. ................. 526/348.2; 526/159; 526/348
[58] Field of Search ............... 526/348, 348.2, 526/159

[56] References Cited

U.S. PATENT DOCUMENTS

| | | | |
|---|---|---|---|
| 2,933,483 | 4/1960 | Coover, Jr. ........................ | 526/348.2 X |
| 3,228,921 | 1/1966 | Gumboldt et al. ................... | 260/88.2 |
| 3,257,367 | 6/1966 | Haven, Jr. ........................ | 526/348.2 X |
| 3,264,277 | 8/1966 | Winkler et al. .................... | 260/93.7 |
| 3,513,140 | 5/1970 | Hambling et al. ................... | 260/80.78 |
| 3,562,241 | 2/1971 | Witt .............................. | 260/94.9 |
| 3,629,222 | 12/1971 | Coover, Jr. et al. ............... | 526/348.2 X |
| 3,686,155 | 8/1972 | Wagensommer ....................... | 260/88.2 |
| 3,718,635 | 2/1973 | Tomoshige et al. .................. | 260/93.7 |
| 4,028,481 | 6/1977 | Shiomura et al. ................... | 526/142 |
| 4,342,854 | 8/1982 | Hogan et al. ...................... | 526/75 |
| 4,798,866 | 1/1989 | Yoshitake et al. .................. | 525/191 |

FOREIGN PATENT DOCUMENTS 1145886  3/1969  United Kingdom.

*Primary Examiner*—Fred Teskin
*Attorney, Agent, or Firm*—Carl D. Corvin

[57] ABSTRACT

A new polymer and copolymer composition comprising 3-ethyl-1-hexene is provided, This new polymer composition of 3-ethyl-1-hexene homopolymer has a crystalline melting point of about 425° C. to about 435° C. and is particularly useful for applications requiring high temperatures, This new polymer and copolymer composition is produced by utilizing a catalyst comprising at least one transition metal and at least one organometallic halide compound.

9 Claims, No Drawings

5,536,802

POLYMERS OF 3 ETHYL-1-HEXENE

This application is a continuation of application Ser. No. 07/973,201, filed on Nov. 6, 1992, now abandoned which is a continuation of application Ser. No. 07/645,992, filed on Jan. 25, 1991, now abandoned.

BACKGROUND OF THE INVENTION

This invention relates to polymers and copolymers of 3-ethyl-1-hexene (3EH1). Furthermore, it relates to a process for making polymers and copolymers from 3-ethyl-1-hexene.

Polyolefin compositions and processes for making polyolefin compositions are well known in the art. It is also known in the art, that polyolefin compositions can be divided into two distinct classes of compounds. These classes are called amorphous polymers and crystalline polymers. These classifications broadly define the physical properties of the polymers that fall within these groups. For example, amorphous polymers lack a definite crystal structure as well as a defined melting point. On the other hand, crystalline polymers have a definite crystal structure as well as an easily identifiable crystalline melting point. Most polyolefin compositions however, would fall somewhere between these two extreme examples. That is, they would tend to have regions which are amorphous and they would also tend to have regions which are crystalline. Therefore, the amount of crystalline regions and the amount of amorphous regions will determine, in general, the physical properties of the polyolefin composition.

It is known in the art that 3-ethyl-1-hexene has been listed, in patents, as a polymerizable olefin. Usually however, the 3-ethyl-1-hexene monomer is included in a laundry list of polymerizable olefins. It should be noted however, that although the 3EH1 monomer is listed as a polymerizable olefin, there are no known examples of polymerizing 3EH1 in the art. Additionally, in contrast to this invention, there are no known cases of polymersizing a substantially crystalline 3EH1 homopolymer.

SUMMARY OF THE INVENTION

It is an object of this invention to provide a new polymer composition comprising 3-ethyl-1-hexene.

It is also an object of this invention to provide a process to make a new polymer composition comprising 3-ethyl-1-hexene.

It is another object of this invention to provide a new copolymer composition comprising an alpha-olefin and 3-ethyl-1-hexene.

It is a further object of this invention to provide a process to make a new copolymer composition comprising an alpha-olefin and 3-ethyl-1-hexene.

According to this invention, a polymer composition comprising a substantially crystalline polymer of 3-ethyl-1-hexene is provided. Furthermore, a substantially crystalline copolymer composition comprising an alpha-olefin and 3-ethyl-1-hexene is provided. This new polymer and copolymer composition is produced by utilizing a catalyst comprising at least one transition metal and at least one organometallic halide compound.

DETAILED DESCRIPTION OF THE INVENTION

Very broadly speaking, the practice of this invention involves polymerizing 3-ethyl-1-hexene in the presence of a catalyst comprising at least one transition metal and an organometallic halide compound under suitable reaction conditions; to form a polymer or copolymer composition comprising 3-ethyl-1-hexene.

3-Ethyl-1-hexane

It should be noted that when the goal is to produce a homopolymer composition comprising 3-ethyl-1-hexene, it is required that the monomer feed be substantially pure. "Substantially pure" means that impurities such as oxygen, sulfur or any other compound capable of acting as a catalyst poison is essentially eliminated. Furthermore, substantially no other olefin should be present in the reaction mixture. This is to provide an environment in which the 3-ethyl-1-hexene monomer can polymerize. Stated quantitatively, the generally desired purity range for the 3-ethyl-1-hexene monomer is about 90 to about 100%, with a preferred purity range of about 95 to 100%, where all the percents are based on the total weight of the monomer and undesired constitutents. It is most preferred however, that a range of about 99 to 100% is used. These ranges are preferred even though the cost of attaining a high purity monomer is expensive. This is because the properties of the resulting polymer are superior than when using the lower purity monomer. This is not to mean theft the lower purity monomer cannot be used in any application. On the contrary, where the superior properties attained from using a pure monomer are not required, a lower purity monomer can be used. One preferred method for obtaining the 3-ethyl-1-hexene monomer is by the codimerization of ethylene with 1-hexene followed by the separation of the monomer from the other constituents in the reactor. An example of a process and a catalyst to use in codimerizing ethylene and 1-hexene can be found in U.S. Pat. Nos. 4,810,668 and 4,895,819.

Comonomers

Comonomers which are useful in the application of this invention include those alpha-olefins which have from 2 to about 20 carbon atoms per molecule. Preferably however, the comonomer has between 3 and 12 carbon atoms per molecule. Most preferably, the comonomer has between 4 and 10 carbon atoms per molecule. However, depending on the particular end use applications of the copolymer composition these ranges can vary. Examples of such alpha-olefins include, but are not limited to, ethylene, propylene, 1-butene, 1-pentene, 1-decene, 3-methyl-1-butene, 3-methyl-1-pentene, 3-methyl-1-hexene, 3-methyl-1-octene, 4-methyl-1-pentene, 4-methyl-1-hexene, 5-methyl-1-hexene, 3-ethyl-1-pentene, 3-ethyl-1-octene, 3,3-dimethyl-1-pentene, 4,4-dimethyl-1-pentene, 3,4-dimethyl-1-pentene, 3,3-dimethyl-1-hexene, 4,4-dimethyl-1-hexene, 3,4-dimethyl-1-hexene and 3-methyl-4-ethyl-1-hexene. Preferably, when using the comonomer it is also somewhat purified so that impurities such as oxygen, sulfur or any other compound capable of acting as a catalyst poison, are not present.

The amount of comonomer to use in this invention is preferably in the range of about 1 to about 25 weight percent of comonomer where the weight percent of the comonomer is based on the total weight of the copolymer. More preferably, the weight percent of comonomer used is in the range of about 2 to about 20 weight percent, and most preferably, it is in the range of about 5 to about 15 weight percent of comonomer.

Catalyst

In general, those types of catalysts which are suitable in the practice of this invention are transition metals used in combination with organometallic halide compounds of Groups I, II and III of the Periodic Table of the Elements.

Typically, transition metals are those metals from groups IVA through VIA of the Periodic Table of the Elements. Specifically, titanium, chromium, vanadium, zirconium, and hafnium are used as catalytic sources. These metals are noted for exhibiting a wide variety of oxidation states and forming numerous catalyst complexes useful in polymerizing ethylene and propylene.

Transition metals particularly useful in this invention include, but are not limited to, titanium halide compounds having the general formula:

(1) $TiX_3$ wherein X is a halogen atom selected independently from the group consisting fluorine, chlorine, bromine, and iodine; or (2) $TiX_3 \cdot \frac{1}{3}AlX_3$, such as $TiCl_3 \cdot \frac{1}{3}AlCl_3$;

These titanium halide compounds are well known in the art and can be made by various methods in the art. Examples of such methods are disclosed in U.S. Pat. Nos. 3,718,635 and 4,028,481 which are hereby incorporated by reference.

In general, organometallic halide compounds suitable for use in this invention are alkyl aluminum compounds which can be represented by the general formula $AlR_nX_{3-n}$ wherein:

(1) R is a hydrocarbon radical containing 1 to 18 carbon atoms;

(2) X is independently selected from the group consisting of fluorine, chlorine, bromine or iodine; and (3) n is an integer from 1 to 2.

A specific example of a compound represented by this formula is diethylaluminum chloride.

Reaction Conditions

The reactants of this invention can be reacted under various conditions. For example, the reactants can be reacted in a gaseous phase, a solution phase, or a slurry phase type of reaction. Most preferred however is the slurry phase reaction type system because 3EH1 is not very volatile and poly(ethyl-hexene) is not very soluble. This means that a gas phase process must be conducted at a high temperature in order to keep the 3EH1 monomer in a gaseous phase. This contributes to an expensive and time consuming process. Furthermore, because poly(ethyl-hexene) is very insoluble there will be a tendency for the polymer to fall out of solution in a solution phase type production process. Consequently, solution phase production processes would not be very economical to run.

The polymerization reaction can be carried out at any suitable temperature. In general, the temperature range for the polymerization reaction is in the range of about 20° C. to about 200° C. Preferably however, the polymerization reaction is conducted in a temperature range of about 50° C. to about 150° C., and most preferably in the range of about 60° C. to about 120° C. These temperature ranges are preferred because below about 20° C. the polymerization of the 3EH1 monomer proceeds too slowly to be economically useful. Furthermore, above about 200° C. catalytic complexes tend to decompose and lose their catalytic activity. Therefore, it is preferred to run the polymerization reaction in a temperature range between these two extremes.

The polymerization reaction can be carried out at any reasonable pressure. In general, the pressure range for practicing the invention is from about subatmospheric pressure to superatmospheric pressure. However, higher pressures tend to be cost prohibitive as well as not being required for effective polymerization.

In general, during the practice of the invention, the monomer is dissolved or suspended in a suitable hydrocarbon solvent or diluent. Preferably an aliphatic or a cycloaliphatic hydrocarbon is used as a solvent or diluent. Examples of such suitable solvents or diluents are butane, pentane, hexane, heptane, cyclohexane, methylcyclohexane, or mixtures thereof. In the alternative, the monomer itself can act as a diluent or solvent.

The two components of the catalyst, i.e., the transition metal compound and the organoaluminum halide compound, can be added separately to the reactor containing time monomer, or they can be premixed and heated for a period of time prior to being introduced into the reactor. The polymerization is then allowed to proceed for a sufficient period of time in order to form the desired product. Following this, a suitable deactivating agent is introduced to deactivate the catalyst, and to stop the polymerization reaction. A suitable deashing agent can then be introduced and the deashing is permitted to proceed for a period of time sufficient to deash the product. Additionally, it is possible to combine the deactivating step and the deashing step by using the same compound which performs both functions. Other ingredients such as additives and stabilizers are optionally, though frequently, combined with the product. The product can then be collected and dried at suitable temperatures. Alternatively, the polymer can be continuously removed from the reactor and processed according to known methods in the art.

Product

The melting point of the inventive homopolymer obtained by this process will be found to be within the range of 425° C. to 435° C. This polymer has a degree of crystallinity not before found in the art. For example, U.S. Pat. No. 3,264,277 discloses an olefin polymerization process using a Zigler-Natta type catalyst modified with a tributylphosphite. Column 6, lines 12–13, discloses that the process can polymerize 3-ethyl-hexene-1, although no example is given. Using this process as set forth in Example I, it has been found that the process produces an essentially amorphous polymer with 3-ethyl-hexene-1. That is, the product produced using 3-ethyl-hexene-1 monomer and the process disclosed in Example I of U.S. Pat. No. 3,264,277 has either a very low degree of crystallinity or no crystallinity at all, and consequently, it has either a very low melting point or no melting point at all. In contrast, using this invention, a polymer made from substantially pure 3-ethyl-1-hexene will provide a composition with a very high melting point in the range of about 425° C. to about 435° C. In other words, the polymer could also be described as a substantially crystalline polyolefin composition made up essentially of monomer units from 3-ethyl-1-hexene. This substantially crystalline structure contributes to the high crystalline melting point of this polymer.

This polymer can be further characterized as having relatively high densities when compared to the predominantly amorphous polymers found in the prior art. Another characteristic of this polymer is that it is normally insoluble in such ordinary solvents as methyl isobutyl ketone, chloroform, carbon tetrachloride, benzene, and pentane at temperatures up to about the boiling point of the solvents at atmospheric pressure.

EXAMPLES

These examples are provided to further assist a person skilled in the art with understanding this invention. The particular reactants, conditions, and the like, are intended to be merely illustrative of this invention and sure not meant to be construed as unduly limiting the reasonable scope of this invention.

Example I

This example illustrates a process for producing the new and unique poly(3EH1) homopolymer of this invention, To a dry Dieis-Alder bottle charged with 1 gram of $TiCl_3$ and a magnetic stirring bar was added 103.54 g of 3-ethyl-1-hexene and 2.73 g of diethylaluminum chloride dissolved in 8.18 g of n-heptane, The slurry obtained was heated in an oil bath at 80° C. for a total of 48 hours. The catalyst was deactivated and the polymer deashed by adding approximately 50 mLs of n-heptane containing 2 mLs of acetylacetone and 2 mLs of propylene oxide. The deashing step was repeated until the washings were colorless. The poly(3-ethyl-1-hexene) isolated weighed 55.2 g. The melting point determined by Differential Scanning Calorimetry (DSC) using a Perkin-Elmer model DSC-7 differential scanning calorimeter was 430.3° C., The melting point was taken as the peak of the melting endotherm using a heating rate of 20° C. per minute.

Example II

This example further illustrates a process for producing the new and unique poly(3EH1) homopolymer of this invention.

Polymerization of 3-ethyl-1-hexene was conducted using a solid titanium trichloride complex and diethylaluminum chloride. The titanium trichloride complex used is a commercially available complex such as the complex described in U.S. Pat. No. 4,210,738 sold by the Solvay and Cie Company of Brussels, Belgium under the trade name Solvay 01.

In a nitrogen filled dry box, a 200 mL crown capped bottle was charged with 1.0 g of Solvay 01 catalyst and a magnetic stir bar. The bottle was capped and removed from the dry box where it was further charged with 33.5 g of 3-ethyl-1-hexene and 0.18 g of diethylaluminum chloride in 0.53 g of n-hexane. The bottle was stirred in an oil bath at 50° C. for 48 hours. The polymerization was terminated and the polymer was deashed by adding a solution of acetylacetone and propylene oxide in n-heptane. The polymer was treated five Times with 100 mLs of the deashing solution before being dried in a vacuum oven. The dry 3EH1 homopolymer weighed 15.2 g. The melting point determined by Differential Scanning Calorimetry (DSC) using a Perkin Elmer model DSC-7 differential scanning calorimeter was 429.3° C. The melting point was taken as the peak of the melting endotherm using a heating rate of 20° C. per minute.

Comparative Example I

As a comparative example, an attempt was made to produce poly(3-ethyl-hexene) using the procedure described in Example I of U.S. Pat. No. 3,264,277. The catalyst was prepared by first taking a 1 quart bottle and drying it at 120° C. and then purging said bottle with nitrogen while it cooled to room temperature. Thereafter, 150 milliliters of n-heptane, 1.90 grams (10 millimoles) of $TiCl_4$, 2.61 grams of a 15 weight percent solution of triethylaluminum in n-heptane (3.4 millimoles TEA), and a magnetic stir bar were added to the bottle. The bottle was then placed in an oil bath and heated at 79° C. for two hours. The bottle was then removed from the heat and 7.99 grams of 15 weight percent solution of TEA (10.5 millimoles) in n-heptane was added. Thereafter, the bottle was placed back in the oil bath for an additional hour at 79° C. The polymerization of 3EHI was accomplished by placing 50 milliliters of n-heptane, 4.28 grams of a 15 weight percent solution of TEA (5.62 millimoles) in n-heptane, 1.35 milliliters of a 10 volume percent tributylphosphite solution in n-heptane (0.50 millimoles), 20 grams of 3-ethyl-1-hexene (97.5 percent purity), 9.5 grams of the catalyst solution as made above into a 300 milliliter bottle. The bottle was then inserted into a water bath and tumbled at 50° C. for about 22 hours. The bottle was opened and the contents poured into 250 milliliters of methanol. The mixture was filtered, washed with 100 milliliters of methanol, 100 milliliters of distilled water, and 100 milliliters of methanol again. A white solid material was dried in a vacuum to a dry weight of 0.29 grams. Subsequently, this material was measured for a melting point with a DSC-7 Differential Scanning Calorimeter. It was found that the sample prepared according to the method of U.S. Pat. No. 3,264,277 did not have a melting point which was measurable.

CONCLUSIONS

It is apparent from the above examples that a new substantially crystalline polymer of 3-ethyl-1-hexene has been produced. This new polymer composition can be characterized by its very high melting point of about 425° C. to about 435° C. Additionally, as a further benefit, the yields from this process are in the economically useful range for production.

That which is claimed is:

1. A homopolymer that consists essentially of 3-ethyl-1-hexene, wherein said homopolymer has a melting point in the range of about 425° C. to about 435° C.

2. A homopolymer according to claim 1 wherein said homopolymer has a melting point in the range of 425° C. to 435° C.

3. A polymer composition comprising a homopolymer, wherein said homopolymer consists essentially of 3-ethyl-1-hexene, and wherein said homopolymer has a melting point in the range of about 425° C. to about 435° C.

4. A polymer composition according to claim wherein said homopolymer has a melting point in the range of 425° C. to 435° C.

5. A polymer composition comprising a homopolymer, wherein said homopolymer consists essentially of 3-ethyl-1hexene monomer, and wherein said homopolymer has a melting point in the range of about 425° C. to about 435° C., and wherein said homopolymer is produced by polymerizing 3-ethyl-1-hexene monomer with a catalyst that consists essentially of:

(1) titanium trihalide ($TiX_3$) wherein each X is independently selected from the group consisting of fluorine, chlorine, bromine, and iodine; and (2) alkyl aluminum halide ($AlR_nX_{3-n}$) wherein
  (a) R is a hydrocarbon radical containing 1 to 18 carbon atoms (b) X is independently selected from the group consisting of fluorine, chlorine, bromine, or iodine (c) n is an integer from 1 to 2.

6. A polymer composition according to claim 1 wherein said homopolymer is produced from substantially pure 3-ethyl-1-hexene monomer.

7. A polymer composition according to claim 1 wherein said titanium trihalide is titanium trichloride.

8. A polymer composition according to claim 1 wherein said alkyl aluminum halide is diethyl aluminum chloride.

9. A polymer composition according to claim 1 where said titanium trihalide is titanium trichloride and said alkyl aluminum halide is diethyl aluminum chloride.

* * * * *

UNITED STATES PATENT AND TRADEMARK OFFICE
CERTIFICATE OF CORRECTION

PATENT NO. : 5,536,802
DATED : July 16, 1996
INVENTOR(S) : Phil M. Stricklen and Charles A. Drake It is certified that error appears in the above-indentified patent and that said Letters Patent is hereby corrected as shown below:

Column 6, claim 4, line 52, the claim dependency needs to be inserted, should read "claim 3".

Column 6, claim 5, line 57, "1hexene" should read "1-hexene".

Signed and Sealed this

Thirteenth Day of May, 1997

Attest:

BRUCE LEHMAN

*Attesting Officer*     *Commissioner of Patents and Trademarks*